US012223925B2

(12) United States Patent
Liu

(10) Patent No.: US 12,223,925 B2
(45) Date of Patent: Feb. 11, 2025

(54) DISPLAY PANEL WITH A SIGNAL ADJUSTING TRACE AND DISPLAY DEVICE

(71) Applicant: GUANGZHOU CHINA STAR OPTOELECTRONICS SEMICONDUCTOR DISPLAY TECHNOLOGY CO., LTD., Guangdong (CN)

(72) Inventor: Qian Liu, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,828

(22) PCT Filed: Apr. 19, 2022

(86) PCT No.: PCT/CN2022/087655
§ 371 (c)(1),
(2) Date: Sep. 28, 2023

(87) PCT Pub. No.: WO2023/178776
PCT Pub. Date: Sep. 28, 2023

(65) Prior Publication Data

US 2024/0161712 A1 May 16, 2024

(30) Foreign Application Priority Data

Mar. 24, 2022 (CN) ......................... 202210300724.2

(51) Int. Cl.
*G09G 3/36* (2006.01)

(52) U.S. Cl.
CPC ......... *G09G 3/3688* (2013.01); *G09G 3/3614* (2013.01); *G09G 2310/0297* (2013.01); *G09G 2330/021* (2013.01)

(58) Field of Classification Search
CPC .. G09G 3/3688; G09G 3/3614; G09G 3/3648; G09G 3/20; G09G 2310/0297; G09G 2330/021; G02F 1/136286
See application file for complete search history.

(56) References Cited

U.S. PATENT DOCUMENTS

2004/0104880 A1* 6/2004 Kang .................. G09G 3/3688 345/94
2005/0237291 A1* 10/2005 Aoki .................. G09G 3/3614 345/100

(Continued)

FOREIGN PATENT DOCUMENTS

CN 103137089 A 6/2013
CN 104950543 A 9/2015

(Continued)

OTHER PUBLICATIONS

International Search Report in International application No. PCT/CN2022/087655,mailed on Dec. 16, 2022.

(Continued)

*Primary Examiner* — Stephen G Sherman
(74) *Attorney, Agent, or Firm* — PV IP PC; Wei Te Chung

(57) ABSTRACT

A display panel and a display device are disclosed in the present application. The display panel includes a plurality of data lines, a Demux circuit, a plurality of signal lines, and at least one signal adjusting trace. Wherein the signal adjusting trace and corresponding signal lines are disposed in different layers and intersect with each other, along a second direction, the signal adjusting trace is configured to output a voltage adjusting signal at least before a next controlling (Continued)

signal is output by controlling traces, to adjust a voltage value of a next data voltage output by the signal line within an output period of the voltage adjusting signal.

19 Claims, 4 Drawing Sheets

(56) References Cited

U.S. PATENT DOCUMENTS

| | | | | |
|---|---|---|---|---|
| 2007/0040794 | A1* | 2/2007 | Kwak | G09G 3/3688 345/100 |
| 2013/0141320 | A1* | 6/2013 | Kim | G09G 3/3685 345/92 |
| 2017/0076665 | A1 | 3/2017 | Kim | |

FOREIGN PATENT DOCUMENTS

| | | | |
|---|---|---|---|
| CN | 111276105 | A | 6/2020 |
| CN | 111554242 | A | 8/2020 |
| CN | 216118747 | U | 3/2022 |

OTHER PUBLICATIONS

Written Opinion of the International Search Authority in International application No. PCT/CN2022/087655, mailed on Dec. 16, 2022.

* cited by examiner

DISPLAY PANEL WITH A SIGNAL ADJUSTING TRACE AND DISPLAY DEVICE

TECHNICAL FIELD

The present application relates to a field of display technology, and particularly to a display panel and a display device.

BACKGROUND

At present, during design of display panels, in order to reduce a number of output channels of driver chips, demultiplexer (Demux) circuits are added to driving circuits of the display panels, so as to reduce the output channels of source driver chips by several times.

As to the Demux circuit, a plurality of Demux driving signals are needed. Delay of driving signals occurs due to resistance and capacitance (RC) delay caused by controlling units and traces of the Demux circuit, rising edges and falling edges are induced, and the controlling units of Demux circuit are wrongly turned on, which affects charging accuracy and stability of the display panel.

SUMMARY

A display panel and a display device are provided by the present application to solve a problem that the controlling units of Demux circuits are wrongly turned on and affect charging accuracy and stability of the display panels.

A display panel is provided, including:

- a plurality of data lines, wherein the plurality of data lines are arranged side by side at intervals along a first direction;
- a plurality of signal lines, wherein the plurality of signal lines are arranged side by side at intervals along the first direction;
- a Demux circuit, wherein the Demux circuit comprises a plurality of controlling traces and a plurality of controlling modules, the plurality of controlling traces are arranged side by side at intervals along a second direction, the first direction intersects the second direction, each of the controlling modules comprises a plurality of controlling units, a first end of each of the controlling units is connected to a corresponding one of the controlling traces, a second end of each of the controlling units is connected to a corresponding one of the data lines, and a third end of each of the controlling units is connected to a same one of the signal lines, and
- at least one signal adjusting trace, wherein each of the signal adjusting traces and corresponding one or more of the signal lines are disposed in different layers and intersect with each other, along the second direction, each of the signal adjusting traces is configured to output a voltage adjusting signal at least before a next controlling signal is output by the plurality of controlling traces, to adjust a voltage value of a next data voltage output by the corresponding one or more of the signal lines within an output period of the voltage adjusting signal; and Optionally, in embodiments of the present application, adjacent two of the data lines are configured to transmit data voltages of opposite polarities, and the voltage adjusting signal is of opposite polarity to the next data voltage output by the corresponding one or more of the signal lines.

Optionally, in embodiments of the present application, an absolute value of a voltage of the voltage adjusting signal is greater than or equal to an absolute value of a voltage of the next data voltage output by the corresponding one or more of the signal lines.

Optionally, in embodiments of the present application, the voltage adjusting signal is a common voltage.

Optionally, in embodiments of the present application, the voltage adjusting signal partially overlaps controlling signals output by the controlling traces, and a pulse width of the voltage adjusting signal is less than pulse widths of the controlling signals output by the controlling traces.

Optionally, in embodiments of the present application, the signal adjusting trace is set as one, the signal adjusting trace extends along the first direction and the signal adjusting trace and the plurality of signal lines are disposed in different layers and intersect with each other.

Optionally, in embodiments of the present application, the signal adjusting traces are set as a plurality, and each of the signal adjusting traces is arranged in a one-to-one correspondence to the signal lines, each of the signal adjusting traces extends along the first direction and each of the signal adjusting traces and a corresponding one of the signal lines are disposed in different layers and intersect with each other.

Optionally, in embodiments of the present application, the signal adjusting trace comprises one first signal adjusting trace and a plurality of second signal adjusting traces;

- the first signal adjusting trace extends along the first direction, and the first signal adjusting trace and the plurality of signal lines are disposed in different layers and intersect with each other;
- the plurality of second signal adjusting traces are arranged in a one-to-one correspondence with the signal lines, each of the second signal adjusting traces extends along the first direction and each of the signal adjusting traces and a corresponding one of the signal lines are disposed in different layers and intersect with each other.

Optionally, in embodiments of the present application, during a same period of a display image of one frame, the plurality of data lines are configured to transmit data voltages of a same polarity, and a voltage value of the voltage adjusting signal equals voltage values of current data voltages output by the corresponding one or more of the signal lines.

Optionally, in embodiments of the present application, wherein the controlling units comprise thin-film transistors, and gate electrodes of the thin-film transistors are electrically connected to corresponding controlling traces, source electrodes of the thin-film transistors are electrically connected to corresponding signal lines, and drain electrodes of the thin-film transistors are electrically connected to corresponding data lines.

Correspondingly, a display device is also provided in the present application, including a display panel and a source driver chip, and the display panel includes:

- a plurality of data lines, wherein the plurality of data lines are arranged side by side at intervals along a first direction;
- a plurality of signal lines, wherein the plurality of signal lines are arranged side by side at intervals along the first direction;
- a Demux circuit, wherein the Demux circuit comprises a plurality of controlling traces and a plurality of controlling modules, the plurality of controlling traces are arranged side by side at intervals along a second direction, the first direction intersects the second direction, each of the controlling modules comprises a plurality of controlling units, a first end of each of the controlling units is connected to a corresponding one of the controlling traces, a second end of each of the controlling units is connected to a corresponding one of the data lines, and a third end of each of the controlling units is connected to a same one of the signal lines, and at least one signal adjusting trace, wherein each of the signal adjusting traces and corresponding one or more of the signal lines are disposed in different layers and intersect with each other, along the second direction, each of the signal adjusting traces is configured to output a voltage adjusting signal at least before a next controlling signal is output by the controlling traces, to adjust a voltage value of a next data voltage output by the corresponding one or more of the signal lines within an output period of the voltage adjusting signal; and the source driver chip is configured to transmit data voltages to the signal lines.

Optionally, in embodiments of the present application, adjacent two of the data lines are configured to transmit data voltages of opposite polarities, and the voltage adjusting signal is of opposite polarity to the next data voltage output by the corresponding one or more of the signal lines.

Optionally, in embodiments of the present application, an absolute value of a voltage of the voltage adjusting signal is greater than or equal to an absolute value of a voltage of the next data voltage output by the corresponding one or more of the signal lines.

Optionally, in embodiments of the present application, the voltage adjusting signal is a common voltage.

Optionally, in embodiments of the present application, the voltage adjusting signal partially overlaps controlling signals output by the controlling traces, and a pulse width of the voltage adjusting signal is less than pulse widths of the controlling signals output by the controlling traces.

Optionally, in embodiments of the present application, the signal adjusting trace is set as one, the signal adjusting trace extends along the first direction and is disposed in a different layer from the plurality of signal lines and intersect with the signal lines.

Optionally, in embodiments of the present application, a plurality of signal adjusting traces are arranged, and each of the signal adjusting traces corresponds to one of the signal lines, each of the signal adjusting traces extends along the first direction and each of the signal adjusting traces and a corresponding one of the signal lines are disposed in different layers and intersect with each other.

Optionally, in embodiments of the present application, the signal adjusting trace comprises one first signal adjusting trace and a plurality of second signal adjusting traces;

the first signal adjusting trace extends along the first direction, and the first signal adjusting trace and the plurality of signal lines are disposed in different layers and intersect with each other;

the plurality of second signal adjusting traces are arranged in a one-to-one correspondence with the signal lines, each of the second signal adjusting traces extends along the first direction and each of the signal adjusting traces and a corresponding one of the signal lines are disposed in different layers and intersect with each other.

Optionally, in embodiments of the present application, during a same period of a display image of one frame, the plurality of data lines are configured to transmit data voltages of a same polarity, and a voltage value of the voltage adjusting signal equals voltage values of a current data voltages output by the corresponding one or more of the signal lines.

Optionally, in embodiments of the present application, wherein the controlling units comprise thin-film transistors, and gate electrodes of the thin-film transistors are electrically connected to corresponding controlling traces, source electrodes of the thin-film transistors are electrically connected to corresponding signal lines, and drain electrodes of the thin-film transistors are electrically connected to corresponding data lines.

A display panel and a display device are disclosed in the present application. The display device includes the plurality of data lines, the Demux circuit, the plurality of signal lines, and the at least one signal adjusting trace. Wherein the plurality of data lines are arranged side by side at intervals along a first direction. The Demux circuit includes a plurality of controlling traces and a plurality of controlling modules. The plurality of controlling traces are arranged side by side at intervals along the second direction. Each of the controlling modules includes a plurality of controlling units. A first end of each of the controlling units is connected to a corresponding one of the controlling traces, a second end of each of the controlling units is connected to a corresponding one of the data lines, and a third end of each of the controlling units is connected to a same one of the signal lines. The signal adjusting traces and corresponding signal lines are disposed n different layers and intersect with each other. Along the second direction, the signal adjusting trace is configured to output a voltage adjusting signal at least before a next controlling signal is output by the plurality of controlling traces, to adjust the voltage value of the next data voltage output by the signal line within the output period of the voltage adjusting signal. Charging accuracy and stability of the display panel can be improved, when the controlling unit in the Demux circuit is wrongly turned on, so as to improve display quality of the display panel, by adjusting the next data voltage output by the corresponding one or more of the signal lines.

BRIEF DESCRIPTION OF DRAWINGS

In order to more clearly illustrate the technical solution of embodiments of this application, a brief description of drawings that are necessary for the illustration of the embodiments of this application will be given as follows. Obviously, the drawings described below show only some embodiments of this disclosure, and a person having ordinary skill in the art may also obtain other drawings based on the drawings described without making any creative effort.

DETAILED DESCRIPTION OF PREFERRED EMBODIMENTS

The technical schemes of this application will be described clearly and completely below in combination with the drawings in the embodiments of this application. Obviously, the described embodiments are only part of the embodiments of this application, not all of them. A person having ordinary skill in the art may obtain other embodiments based on the embodiments provided in this application without making any creative effort, which all belong to the scope of the present disclosure.

In the description of the present application, it should be understood that the terms "first", "second" and "third" in the application are used for descriptive purposes only and cannot be understood as indicating or implying relative importance or implying numbers of indicated technical features. Thus, a feature defined as "first", "second" etc., may explicitly or implicitly includes one or more than one such features. Therefore, it cannot be understood as a restriction on the present application.

A display panel and a display device are provided by the present application and will be described in detail below. It should be noted that the order of description of the following embodiments does not limit the preferred order of the embodiments of the present application.

Figure 1:
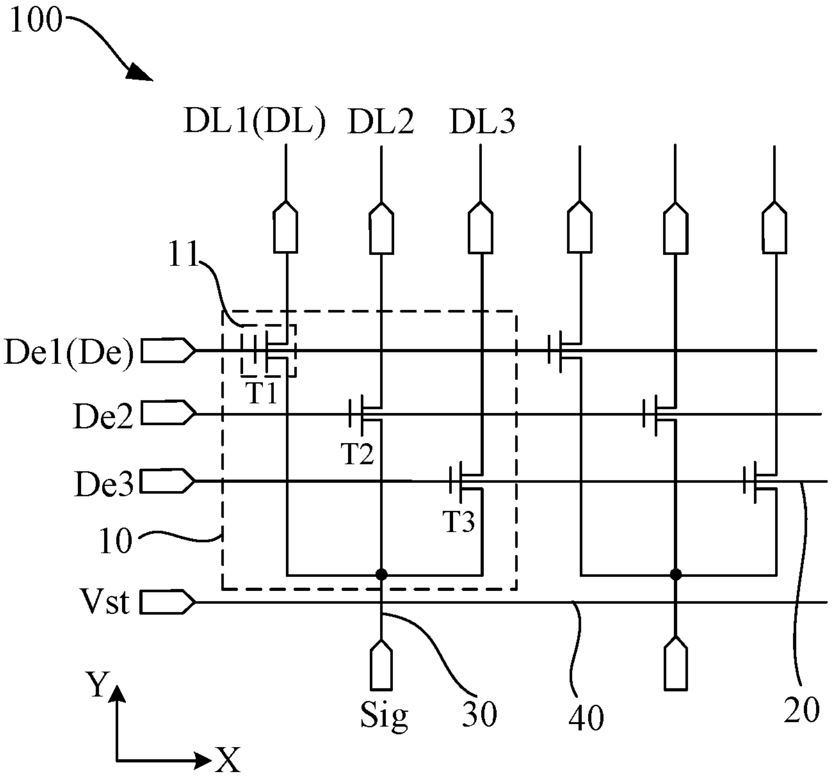
FIG. 1 is a schematic structural diagram of a first partial structure of a display panel provided by the present application.
Figure 2:
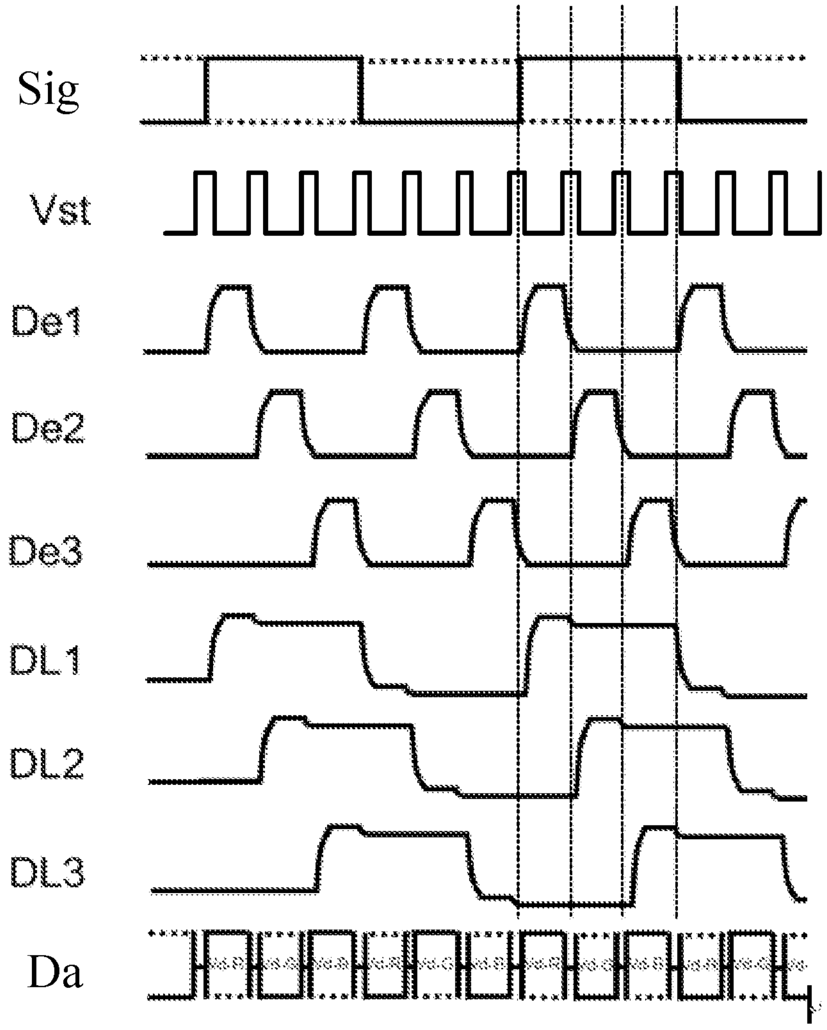
FIG. 2 is a sequence diagram of signals of the display panel provided by the present application.

Please refer to FIG. 1 and FIG. 2. FIG. 1 is a schematic structural diagram of a first partial structure of a display panel provided by the present application. FIG. 2 is a sequence diagram of signals of the display panel provided by the present application. In embodiments of the present application, the display panel 100 includes a plurality of data lines DL, a Demux circuit, a plurality of signal lines 30, and at least one signal adjusting trace 40.

Wherein the plurality of data lines DL are arranged side by side at intervals along a first direction X. The plurality of signal lines 30 are arranged side by side at intervals along a first direction X. The Demux circuit includes a plurality of controlling traces 20 and a plurality of controlling modules 10. The plurality of controlling traces 20 are arranged side by side at intervals along a second direction Y. The first direction X intersects with the second direction Y. Each of the controlling modules 10 includes a plurality of controlling units 11. A first end of each of the controlling units 11 is connected to a corresponding one of the controlling traces 20. A second end of each of the controlling units 11 is connected to a corresponding one of the data lines DL. A third end of each of the controlling units 11 is connected to a corresponding one of the signal lines 30. The signal adjusting trace 40 and corresponding signal lines 30 are disposed in different layers and intersect with each other. Along the second direction Y, the signal adjusting trace 40 is configured to output a voltage adjusting signal Vst at least before a next controlling signal De is output by the plurality of controlling traces 20, to adjust voltage values of next data voltages Da output by the signal lines 30 within an output period of the voltage adjusting signal Vst.

It should be noted that the terms "a/the plurality of" used in the present application refers to "at least two".

Wherein the terms indicating sequences such as "current" and "next" used in the embodiment of the present application only indicate a sequence relative to each other, and do not mean that there is only one current controlling signal De or only one next data voltage Da in the display panel 100. For example, along the second direction Y, when a first controlling signal De1 is output by a first controlling trace 20, current data voltages Da are output by the signal lines 30. When a second controlling signal De2 is output by a second controlling trace 20, next data voltages Da are output by the signal lines 30. When a third controlling signal De3 is output by a third controlling trace 20, next data voltages Da are output by the signal lines 30. By analogy, it will not be repeated here.

A signal adjusting trace 40 is added in the display panel 100 of the embodiments in the present application, the voltage adjusting trace Vst is output at least before the controlling signal is output by the plurality of controlling traces 20. Within the output period during the voltage adjusting signal Vst, as the signal adjusting trace 40 and corresponding signal lines 30 are disposed in different layers, the voltage adjusting signal Vst is able to couple with a next data voltage Da output by the signal lines 30 to adjust voltage values of the next data voltages Da output by the signal lines 30. When one of the controlling units 11 is wrongly turned on, a voltage value of the voltage adjusting signal Vst can be configured according to a voltage value of the current data voltage Da transmitted by a corresponding one of the controlling units 11 which is wrongly turned on, and the voltage value of the next data voltage Da output by the signal line 30. As a result, even if wrong charging occurs, influence of the wrong charging can be reduced, so as to improve charging accuracy and stability of the display panel 100.

In embodiments of the present application, each of the controlling units 11 includes at least one thin-film transistor. A gate electrode of the thin-film transistor is electrically connected to a corresponding one of the controlling traces 20. A source electrode of the thin-film transistor is electrically connected to a corresponding one of the signal lines 30. A drain electrode of the thin-film transistor is electrically connected to a corresponding one of the data lines DL. Certainly, in other embodiments of the present application, the controlling unit 11 can include a plurality of thin-film transistors or other members, as long as connection between the data lines DL and the signal lines 30 can be controlled.

Wherein the thin-film transistors in the embodiments of the present application can be one or more of low temperature polysilicon thin-film transistor, oxide semiconductor thin-film transistor, and amorphous silicon thin-film transistor. In addition, each of the thin-film transistors can be a P-type thin-film transistor or an N-type thin-film transistor. Furthermore, the thin-film transistors in the embodiments of the present application can be thin-film transistors of a same type, so as to avoid negative effect on signal transmission due to differences between different types of thin-film transistors.

In the embodiments of the present application, the Demux circuit can include two controlling traces 20, three controlling traces 20, or four controlling traces 20, etc., which will not be repeated here. For example, when that the Demux circuit includes two controlling traces 20, each of the controlling modules 10 includes two controlling units 11. The two controlling traces 20 control switching of the two controlling units 11, respectively, so as to control the connection between the corresponding data lines DL and signal lines 30. Therefore, signals Sig are transmitted to the corresponding data lines DL by the signal lines 30. Therefore, an amount of the controlling modules 10 is dependent on an amount of the controlling traces 20 and an amount of the data lines DL.

An example of Demux circuit including three controlling traces 20, and each of the thin-film transistors 11 including one N-type thin-film transistor is illustrated in the embodiments of the present application, however, it cannot be understood as a limitation of the present application.

Specifically, three controlling traces 20 output a first controlling signal De1, a second controlling signal De2, and a third controlling signal De3, respectively. Each of the controlling modules 10 includes three controlling units 11, namely, three thin-film transistors, which are a first thin-film transistor T1, a second thin-film transistor T2, and a third thin-film transistor T3. The first controlling signal De1 controls the connection between the signal line 30 and the first data line DL1 by controlling switching of the first thin-film transistor T1. The second controlling signal De2 controls the connection between the signal line 30 and a second data line DL2 by controlling switching of the second thin-film transistor T2. The third controlling signal De3 controls the connection between the signal line 30 and a third data line DL3 by controlling switching of the third thin-film transistor T3.

Correspondingly, the signals Sig include three data signals Da to be transmitted to corresponding data lines DL. In some embodiments, the display panel 100 includes sub-pixels of three colors RGB, and when that the first data line DL1, the second data line DL2, and the third data line DL3 are connected to corresponding sub-pixels of three colors RGB, respectively, the signals Sig can include a red data voltage (Vd-R), a green data voltage (Vd-G), and a blue data voltage (Vd-B). Certainly, the present application is not limited to this.

In embodiments of the present application, each of the controlling modules 10 is connected to three of the data lines DL adjacent to each other. Each of the signal lines 30 can transmit data voltages Da of different polarities alternately, or transmit data voltages Da of a same polarity continuously.

In the embodiments of the present application, when that the display panel 100 is a liquid crystal display panel, adjacent two of the data lines DL can be configured to transmit data voltages of opposite polarities, so as to improve quality of display images. At this time, a polarity of the voltage adjusting signal Vst is opposite to a polarity of the next data voltages Da output by the signal lines 30.

It can be understood that, as to the liquid crystal display panels, liquid crystal molecules cannot be under a control of a fixed voltage at all times. Otherwise, after a long time of being controlled by the fixed voltage, even if the fixed voltage is canceled, the liquid crystal molecules will no longer be able to rotate accordingly in response to changes of electric fields due to destruction of characteristics. Therefore, it is necessary to apply voltages of opposite polarities to the liquid crystals to drive the liquid crystals.

For example, normally, the first controlling signal De1 is at a high level, and the second controlling signal De2 and the third controlling signal DE3 are at a low level. Then, the first thin-film transistor T1 is turned on, and the second thin-film transistor T2 and the third thin-film transistor T3 are turned off. At this moment, the signal Sig is a current data signal Da of positive polarity, and the signal line 30 transmits the current data signal Da to the first data line DL1 through the first thin-film transistor T1. Subsequently, the first controlling signal De1 changes from the high level to a low level, the second controlling signal De2 changes from the low level to a high level, and the third controlling signal De3 remains the low level. Then, the second thin-film transistor T2 is turned on, and the first thin-film transistor T1, and the third thin-film transistor T3 are turned off. At this moment, the signal Sig is a next data signal Da with negative polarity, and the signal line 30 transmits the next data signal Da to the second data line DL2 through the second thin-film transistor T2. By analogy, it will not be repeated here.

However, due to influence of RC delay, there is signal delay in the controlling signals output by the first controlling signal De1 and the second controlling signal De2. When the second controlling signal De2 at the high level is output by the controlling trace 20, the second thin-film transistor T2 is turned on, and the next data signal Da of negative polarity is transmitted by the signal line 30, the first controlling signal De1 has not yet changed to the low level from the high level completely, and the first thin-film transistor T1 remains turned-on. At this moment, the next data signal Da of negative polarity is transmitted to the first data line DL1 through the first thin-film transistor T1. The current data voltage Da of positive polarity should be transmitted to a corresponding one of the sub-pixels by the first data line DL1, due to a wrong charging of the next the data signal Da of negative polarity, insufficient charging of the sub-pixels is likely to be induced, which affects charging stability.

Therefore, the polarities of the next the data voltages Da output by the signal lines 30 and the voltage adjusting signal Vst are opposite, that is, the polarities of the current the data voltages Da output by the signal lines 30 and the voltage adjusting signal Vst are same. Even if wrong charging exists, due to coupling of the voltage adjusting signal Vst to the next data voltages Da, a difference between the data voltage Da wrongly charged to the first data line DL1 is less than a difference between the next data voltage Da and the current data voltage Da, influence of wrong charging is reduced and charging accuracy and stability of the display panel 100 is improved.

In embodiments of the present application, it is possible that an end of a turn-on period of the voltage adjusting signal Vst does not overlap with a front end of a turn-on period of each of the controlling signals De, to ensure sufficient charging time for subsequent data lines DL to be charged using the next data voltage Da as reference. Certainly, the end of the turn-on period of the voltage adjusting signal Vst can also partially overlap with the front end of the turn-on period of each of the controlling signals De, so as to ensure that the voltage adjusting signal Vst is able to couple with the next data voltage Da to change the data voltage Da wrongly charged to the data line DL before the first thin-film transistor T1 is completely turned off, reducing the influence of wrong charging. At a same time, a pulse width of the voltage adjusting signal Vst is less than pulse widths of the controlling signals De output by the controlling traces 20.

It can be understood that after the transmission of the voltage adjusting signal Vst is stopped, the next data voltage Da returns to an original voltage value. The controlling signal De continues to turn on the thin-film transistors to ensure sufficient charging time for subsequent data lines DL to be charged using the next data voltage Da as reference.

Moreover, it should be noted that, in some embodiments of the present application, when the thin-film transistor is an N-type transistor and the controlling signal De is at a high level, the thin-film transistor is turned on. Therefore, the voltage adjusting signal Vst is configured to be at a high level. In other embodiments of the present application, when the thin-film transistor is a P-type transistor and when the controlling signal De is at a low level, the thin-film transistor is turned on. Therefore, the voltage adjusting signal Vst is configured to be at a low level.

Furthermore, in the embodiments of the present application, the voltage adjusting signal Vst is of opposite polarity to the next data voltage Da, and an absolute value of the voltage adjusting signal Vst is greater than or equal to an absolute value of the next data voltage Da.

For example, when the voltage value of the current data voltages Da output by the signal lines 30 is +5V, and the voltage value of the next data voltages Da is −5V, voltage value of the voltage adjusting signal Vst is greater than or equal to +5V. For example, the voltage value of the voltage adjusting signal Vst is +5V, +6V, or +8V, etc. After the voltage adjusting signal Vst couples to the next data voltages Da, a voltage value of the coupled next data voltages Da ranges from −5V to +5V (not including −5V), compared with conventional −5V under the condition of wrong charging, the influence of wrong charging is reduced, which improves charging accuracy of the display panel 100.

For a same reason, when the voltage value of the current data voltages Da output by the signal lines 30 is −5V, and the voltage value of the next data voltages Da is +5V, voltage value of the voltage adjusting signal Vst is less than or equal to −5V. For example, the voltage value of the voltage adjusting signal Vst is −5V, −6V, or −8V, etc. After the voltage adjusting signal Vst couples to the next data voltages Da, a voltage value of the coupled next data voltages Da ranges from −5V to +5V (not including +5V), compared with conventional +5V under the condition of wrong charging, the influence of wrong charging is reduced, which improves charging accuracy of the display panel 100.

Optionally, in other embodiments of the present application, when the voltage adjusting signal Vst is of opposite polarity to the next data voltage De, the voltage adjusting signal Vst can be defined as a common voltage.

In some embodiments of the present application, the voltage adjusting signal Vst is defined as the common voltage, charging effect of each of the sub-pixels under wrong charging can be improved uniformly, it is unnecessary to adjust the voltage value of the voltage adjusting signal Vst based on change of the data signal Da output by the signal lines 20 connected corresponding to each of the controlling modules 10, so that power consumption of the display panel can be reduced.

Certainly, in embodiments of the present application, during a same period of a display image of one frame, the plurality of data lines DL are configured to transmit data voltages Da of a same polarity. At this time, the voltage value of the voltage adjusting signal Vst is equal to the voltage values of the current data voltages Da output by the signal lines 30.

For example, when the voltage value of the current data voltages Da output by the signal lines 30 is +5V, and the voltage value of the next data voltages Da is +3, the voltage value of the voltage adjusting signal Vst can be equal to +5V. After the voltage adjusting signal Vst couples to the next data voltages Da, a voltage value of the coupled next data voltages Da ranges from +5V to +3V (not including +3V), compared with conventional +3V under condition of wrong charging, the influence of wrong charging is reduced, which improves charging accuracy of the display panel 100. Certainly, the voltage value of the voltage adjusting signal Vst can be greater than the voltage value of the next data voltages Da, as long as it is ensured that a voltage value of a coupled data voltage Da is not greater than or just slightly greater than the voltage value of the current data voltage Da. Certainly, it is best that the voltage value of the coupled data voltage Da is equal to the voltage value of the current data voltage Da.

Please refer to FIG. 1 and FIG. 2, in the embodiments of the present application, the signal adjusting trace 40 is set as one. The signal adjusting trace 40 extends along the first direction X and the signal adjusting trace 40 and the plurality of signal lines 30 are disposed in different layers and intersect with each other.

For example, when an image of a single grayscale is displayed by the display panel 100, only the polarities of the data voltages Da output by the signal lines 30 change, while the grayscale remains constant. At this time, the signal adjusting trace 40 is set as one in the display panel 100, and it is possible for the only one signal adjusting trace 40 to couple with the next data voltage Da output by each of the signal lines 30 to obtain a same coupling effect.

For another example, as illustrated in the above-mentioned embodiments of the present application, in order to reduce power consumption, when the voltage adjusting signal Vst is of opposite polarity to the next data voltages De, the voltage adjusting signal Vst can be defined as the common voltage. At this time, the signal adjusting trace 40 can be se as one in the display panel 100.

The signal adjusting trace 40 is set as one in the display panel 100 of embodiments of the present application, a number of traces of the display panel 100 can be decreased, and a complexity of signals can be reduced.

Specifically, the signal adjusting trace 40 can be arranged between fan-shaped trace area and the controlling traces 20, so that intersection with the plurality of signal lines 30 can be realized.

Figure 3:
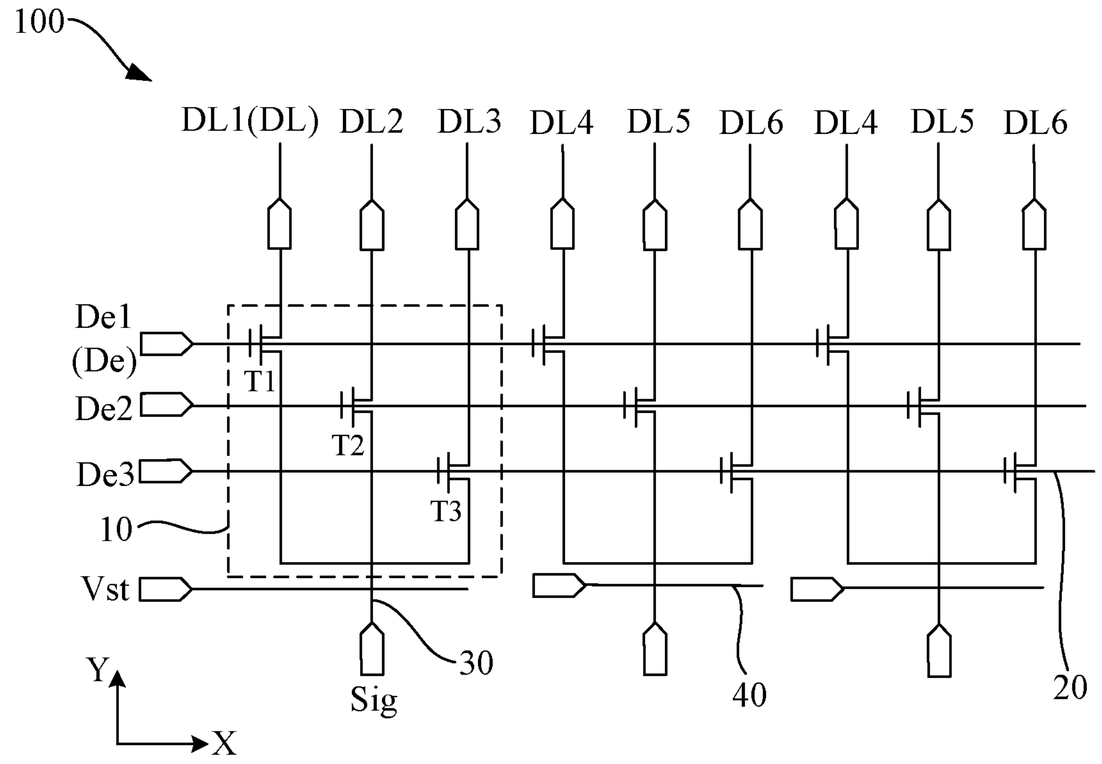
FIG. 3 is a schematic structural diagram of a partial second structure of the display panel provided by the present application.

Please refer to FIG. 2 and FIG. 3. FIG. 3 is a schematic structural diagram of a partial second structure of the display panel provided by the present application. A difference from the display panel 100 shown in FIG. 1 is that, in the embodiment of the present application, signal adjusting trace 40 is set as a plurality. Each of the signal adjusting traces 40 is arranged in a one-to-one correspondence with the signal lines 30. Each of the signal adjusting traces 40 extends along the first direction X. Each of the signal adjusting traces 40 is disposed in the different layer from a corresponding one of the signal lines 30 and intersects with the corresponding one of the signal lines 30.

It can be understood that, when a dynamic picture is displayed on the display panel 100, the data voltage Da corresponding to each of the sub-pixels may be different from each other. Therefore, when wrong charging occurs in multiple places in the Demux circuit, the wrongly charged data voltages Da may be different from each other.

In this regard, the signal adjusting traces 40 are set as a plurality in the display panel 100, and each of the signal adjusting traces 40 intersects with the corresponding one of the signal lines 30. Accordingly, for the current data voltage Da and the next data voltage Da output by each of the signal lines 30, a corresponding voltage adjusting signal Vst can be output through each of the signal adjusting traces 40. Targeted improvement to wrong charging in the display panel 100 is provided, and a further improvement to charging accuracy and stability of the display panel 100 is provided.

Figure 4:
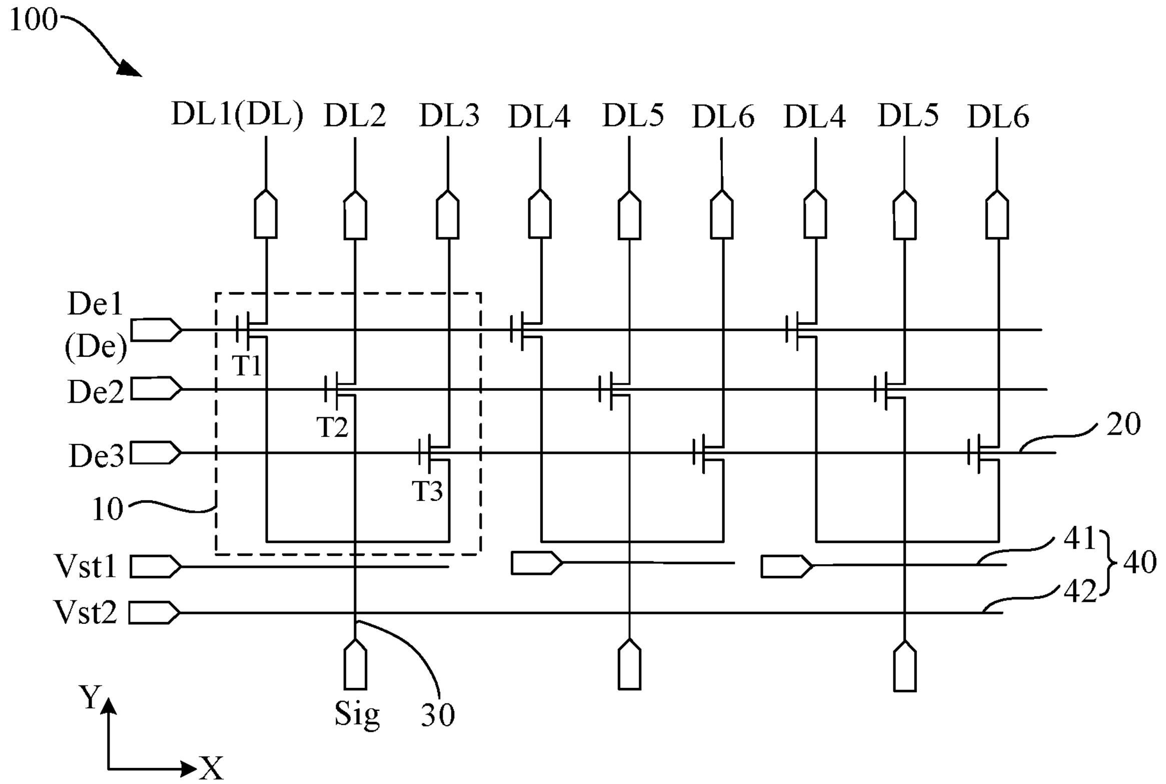
FIG. 4 is a schematic structural diagram of a third partial structure of the display panel provided by the present application.

Please refer to FIG. 2 and FIG. 4. FIG. 4 is a schematic structural diagram of a third partial structure of the display panel provided by the present application. A difference from the display panel 100 shown in FIG. 1 is that, in the embodiments of the present application, the signal adjusting traces 40 include a first signal adjusting trace 41 and a second signal adjusting trace 42. The first signal adjusting trace 41 is configured to output a first voltage adjusting signal Vst1. The second signal adjusting trace 42 is configured to output a second voltage adjusting signal Vst2.

Wherein the first signal adjusting trace 41 is set to one. The first signal adjusting trace 41 extends along the first direction X and is disposed on the different layer from the plurality of signal lines 30 and intersects with the plurality of signal lines 30. The second signal adjusting traces 42 are arranged in a one-to-one correspondence with the signal lines 30. Each of the second signal adjusting traces 42 extends along the first direction X. Each of the second signal adjusting traces 42 is disposed in the different layer from corresponding signal lines 30 and intersects with the corresponding signal lines 30.

Compared to the display panels 100 in FIG. 1 and FIG. 3, in the embodiments of the present application, the first signal adjusting trace 41 and the second signal adjusting traces 42 are simultaneously included in the display panel 100, when the image of a single gray scale is displayed in the display panel 100, only the polarities of the voltage values Da output by the signal lines 30 change, while the gray scale remains constant, or when the voltage adjusting signal Vst1(Vst2) is defined as the common voltage, it is possible that only the first signal adjusting trace 41 is enabled. When a dynamic image is displayed on the display panel 100, it is possible that only the second signal adjusting traces 42 are enabled. Or, when a voltage value difference between the current data voltages Da and the next data voltages Da transmitted by the signal lines is great, so that a relatively great coupling is needed, it is possible that the first signal adjusting trace 41 and the second signal adjusting traces 42 are enabled together.

Figure 5:
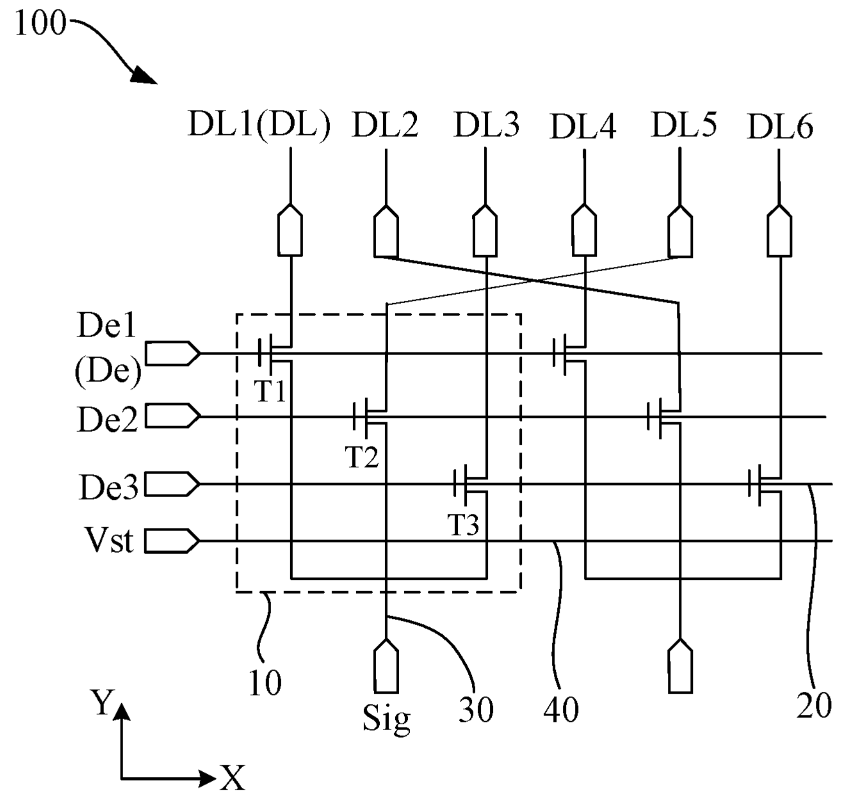
FIG. 5 is a schematic structural diagram of a fourth partial structure of the display panel provided by the present application.

Please refer to FIG. 2 and FIG. 5. FIG. 5 is a schematic structural diagram of a fourth partial structure of the display panel provided by the present application. A difference from the display panel 100 shown in FIG. 1 is that, in the embodiments of the present application, each of the signal lines 30 transmits a data voltage Da of a same polarity, and each of the controlling modules 10 connects the data lines DL of the same polarity to a same signal line 30.

For example, when along the first direction X, a first signal line 30 only outputs a data voltage Da of positive polarity, a second signal line 30 only outputs a data voltage Da of negative polarity. At this time, the first data line DL1, a third data line DL3, and a fifth data line DL5 are electrically connected to the first signal line 30. A second data line DL2, a fourth data line DL4, and a sixth data line DL6 are electrically connected to the second signal line 30, so that the adjacent data lines DL are configured to transmit data voltages Da of different polarities, and at a same time, the power consumption of the source driver chip that output the data signals Da can be reduced.

Correspondingly, a display device is also provided in the present application, including a display panel and a source driver chip, and the display panel is any one of the above-mentioned display panels 100. The source driver chip is configured to transmit data signals to the signal lines.

In addition, the display device can be a smartphone, a tablet computer, an e-book reader, a smartwatch, a camera, a game console, etc., which is not limited in the present application.

Figure 6:
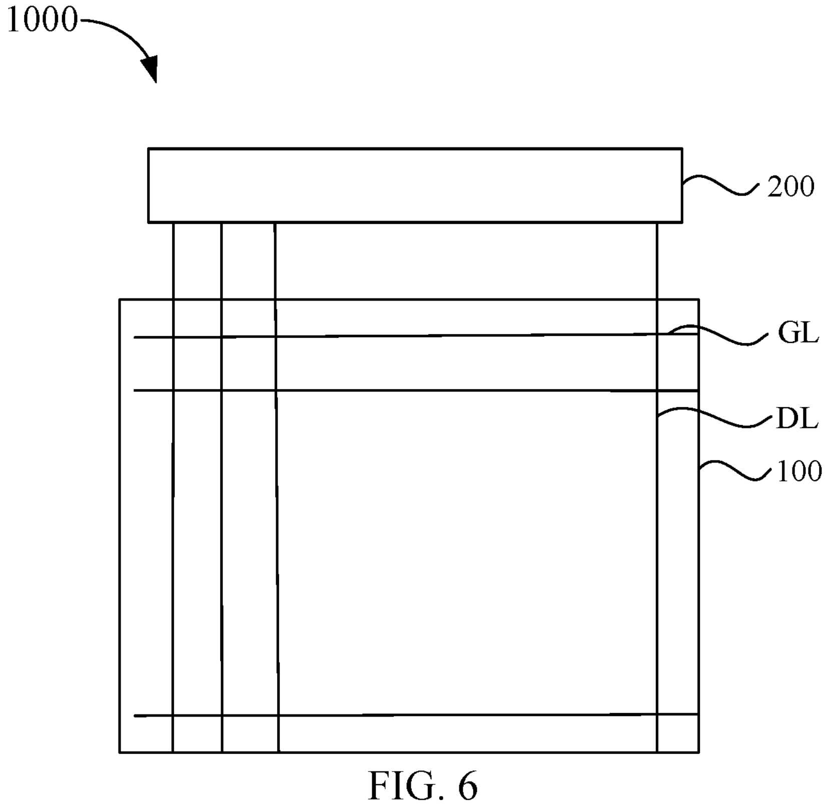
FIG. 6 is a schematic structural diagram of a display device provided by the present application.

Specifically, please refer to FIG. 6. FIG. 6 is a schematic structural diagram of a display device provided by the present application. Wherein the display device 1000 includes a display panel 100 and a source driver chip 200.

Wherein the display panel 100 includes a plurality of scan lines GL and a plurality of data lines DL. The plurality of data lines DL are arranged side by side at intervals along a first direction X. The plurality of scan lines GL are arranged side by side at intervals along the second direction Y. The display panel 100 further includes a plurality of sub-pixels (not shown in the figures), and each of the sub-pixels is electrically connected to a corresponding one of the scan lines GL and a corresponding one of the data lines DL.

Along the second direction Y, the source driver chip 200 can be disposed above the display panel 100, or below the display panel 100. Source driver chip 200 can be at least one. The source driver chip 200 transmits the data signals to the display panel 100 through the data lines DL. In some embodiments, the source driver chip 200 can be bonded to the display panel 100 through a chip on film (COF), but there is no specific limitation in the present application.

Optionally, in the display device 1000 of embodiments of the present application, along the first direction X, the plurality of data lines DL are electrically connected to the source driver chip 200 through the Demux circuit. Thus, output channels of the source driver chip 200 can be reduced by several times, and a number of the source driver chip 200 is reduced, leading to a reduction in cost.

A display device 1000 is provided in the present application. The display device 1000 includes the display panel 100. The display panel 100 includes the Demux circuit and the signal adjusting trace. The signal adjusting trace and corresponding signal lines are disposed different layers and intersect with each other, along the second direction, the signal adjusting trace is configured to output a voltage adjusting signal at least before a next controlling signal is output by the plurality of controlling traces, to adjust the voltage values of the next data voltages output by the signal lines within the output period of the voltage adjusting signal. Charging accuracy and stability of the display panel 100 can be improved in the present application, when the controlling unit in the Demux circuit is wrongly turned on, so as to improve display quality of the display device 1000.

The display panel and display device provided by the present application are described in detail. In this paper, specific examples are applied to illustrate the principle and embodiment of the present application. The description of the above embodiments is only used to help understand the method and core idea of the application. At the same time, for those skilled in the art, according to the thought of the present disclosure, there will be changes in the specific embodiments and application scope. In conclusion, the content of the specification should not be understood as a limitation of the application.

What is claimed is:

1. A display panel, comprising:

a plurality of data lines, wherein the plurality of data lines are arranged side by side at intervals along a first direction;

a plurality of signal lines, wherein the plurality of signal lines are arranged side by side at intervals along the first direction;

a Demux circuit, wherein the Demux circuit comprises a plurality of controlling traces and a plurality of controlling modules, the plurality of controlling traces are arranged side by side at intervals along a second direction, the first direction intersects the second direction, each of the controlling modules comprises a plurality of controlling units, a first end of each of the controlling units is connected to a corresponding one of the controlling traces, a second end of each of the controlling units is connected to a corresponding one of the data lines, and a third end of each of the controlling units is connected to a same one of the signal lines, and at least one signal adjusting trace, wherein each of the at least one signal adjusting trace and corresponding one or more of the signal lines are disposed in different layers and intersect with each other, along the second direction, each of the at least one signal adjusting trace is configured to output a voltage adjusting signal at least before a next controlling signal is output by the controlling traces, to adjust a voltage value of a next data voltage output by the corresponding one or more of the signal lines within an output period of the voltage adjusting signal;

wherein the voltage adjusting signal partially overlaps controlling signals output by the controlling traces, and a pulse width of the voltage adjusting signal is less than a pulse width of each of the controlling signals output by the controlling traces.

2. The display panel according to claim 1, wherein adjacent two of the data lines are configured to transmit data voltages of opposite polarities, and the voltage adjusting signal is of opposite polarity to the next data voltage output by the corresponding one or more of the signal lines.

3. The display panel according to claim 2, wherein an absolute value of a voltage of the voltage adjusting signal is greater than or equal to an absolute value of a voltage of the next data voltage output by the corresponding one or more of the signal lines.

4. The display panel according to claim 2, wherein the voltage adjusting signal is a common voltage.

5. The display panel according to claim 1, wherein the at least one signal adjusting trace is set as one signal adjusting trace, the signal adjusting trace extends along the first direction and the signal adjusting trace and the plurality of signal lines are disposed in different layers and intersect with each other.

6. The display panel according to claim 1, wherein the at least one signal adjusting trace is set as a plurality of signal adjusting traces, and each of the signal adjusting traces is arranged in a one-to-one correspondence to the signal lines, each of the signal adjusting traces extends along the first direction and each of the signal adjusting traces and a corresponding one of the signal lines are disposed in different layers and intersect with each other.

7. The display panel according to claim 1, wherein the at least one signal adjusting trace comprises one first signal adjusting trace and a plurality of second signal adjusting traces;

the first signal adjusting trace extends along the first direction, and the first signal adjusting trace and the plurality of signal lines are disposed in different layers and intersect with each other;

the plurality of second signal adjusting traces are arranged in a one-to-one correspondence with the signal lines, each of the second signal adjusting traces extends along the first direction and each of the signal adjusting traces and a corresponding one of the signal lines are disposed in different layers and intersect with each other.

8. The display panel according to claim 1, wherein during a same period of a display image of one frame, the plurality of data lines are configured to transmit data voltages of a same polarity, and a voltage value of the voltage adjusting signal equals a voltage value of a current data voltage output by the corresponding one or more of the signal lines.

9. The display panel according to claim 1, wherein the controlling units comprise thin-film transistors, and gate electrodes of the thin-film transistors are electrically connected to corresponding controlling traces, source electrodes of the thin-film transistors are electrically connected to corresponding signal lines, and drain electrodes of the thin-film transistors are electrically connected to corresponding data lines.

10. A display device, comprising a display panel and a source driver chip, wherein the display panel comprises:

a plurality of data lines, wherein the plurality of data lines are arranged side by side at intervals along a first direction;

a plurality of signal lines, wherein the plurality of signal lines are arranged side by side at intervals along the first direction;

a Demux circuit, wherein the Demux circuit comprises a plurality of controlling traces and a plurality of controlling modules, the plurality of controlling traces are arranged side by side at intervals along a second direction, the first direction intersects the second direction, each of the controlling modules comprises a plurality of controlling units, a first end of each of the controlling units is connected to a corresponding one of the controlling traces, a second end of each of the controlling units is connected to a corresponding one of the data lines, and a third end of each of the controlling units is connected to a same one of the signal lines, and at least one signal adjusting trace, wherein each of the at least one signal adjusting trace and corresponding one or more of the signal lines are disposed in different layers and intersect with each other, along the second direction, each of the at least one signal adjusting trace is configured to output a voltage adjusting signal at least before a next controlling signal is output by the controlling traces, to adjust a voltage value of a next data voltage output by the corresponding one or more of the signal lines within an output period of the voltage adjusting signal; and the source driver chip is configured to transmit data voltages to the signal lines;

wherein the voltage adjusting signal partially overlaps controlling signals output by the controlling traces, and a pulse width of the voltage adjusting signal is less than a pulse width of each of the controlling signals output by the controlling traces.

11. The display device according to claim 10, wherein adjacent two of the data lines are configured to transmit data voltages of opposite polarities, and the voltage adjusting signal is of opposite polarity to the next data voltage output by the corresponding one or more of the signal lines.

12. The display device according to claim 11, wherein an absolute value of a voltage of the voltage adjusting signal is greater than or equal to an absolute value of a voltage of the next data voltage output by the corresponding one or more of the signal lines.

13. The display device according to claim 11, wherein the voltage adjusting signal is a common voltage.

14. The display device according to claim 10, wherein the at least one signal adjusting trace is set as one signal adjusting trace, the signal adjusting trace extends along the first direction and is disposed in a different layer from the plurality of signal lines and intersect with the signal lines.

15. The display panel according to claim 10, wherein a plurality of signal adjusting traces are arranged, and each of the signal adjusting traces corresponds to one of the signal lines, each of the signal adjusting traces extends along the first direction and each of the signal adjusting traces and a corresponding one of the signal lines are disposed in different layers and intersect with each other.

16. The display panel according to claim 10, wherein the at least one signal adjusting trace comprises one first signal adjusting trace and a plurality of second signal adjusting traces;

the first signal adjusting trace extends along the first direction, and the first signal adjusting trace and the plurality of signal lines are disposed in different layers and intersect with each other;

the plurality of second signal adjusting traces are arranged in a one-to-one correspondence with the signal lines, each of the signal adjusting traces extends along the first direction and each of the signal adjusting traces and a corresponding one of the signal lines are disposed in different layers and intersect with each other.

17. The display device according to claim 10, wherein during a same period of a display image of one frame, the plurality of data lines are configured to transmit data voltages of a same polarity, and a voltage value of the voltage adjusting signal equals to a voltage value of a current data voltage output by the corresponding signal lines.

18. The display device according to claim 10, wherein the controlling units comprise thin-film transistors, and gate electrodes of the thin-film transistors are electrically connected to corresponding controlling traces, source electrodes of the thin-film transistors are electrically connected to corresponding signal lines, and drain electrodes of the thin-film transistors are electrically connected to corresponding data lines.

19. A display panel, comprising:

a plurality of data lines, wherein the plurality of data lines are arranged side by side at intervals along a first direction;

a plurality of signal lines, wherein the plurality of signal lines are arranged side by side at intervals along the first direction;

a Demux circuit, wherein the Demux circuit comprises a plurality of controlling traces and a plurality of controlling modules, the plurality of controlling traces are arranged side by side at intervals along a second direction, the first direction intersects the second direction, each of the controlling modules comprises a plurality of controlling units, a first end of each of the controlling units is connected to a corresponding one of the controlling traces, a second end of each of the controlling units is connected to a corresponding one of the data lines, and a third end of each of the controlling units is connected to a same one of the signal lines, and at least one signal adjusting trace, wherein each of the at least one signal adjusting trace and corresponding one or more of the signal lines are disposed in different layers and intersect with each other, along the second direction, each of the at least one signal adjusting trace is configured to output a voltage adjusting signal at least before a next controlling signal is output by the controlling traces, to adjust a voltage value of a next data voltage output by the corresponding one or more of the signal lines within an output period of the voltage adjusting signal;

wherein during a same period of a display image of one frame, the plurality of data lines are configured to transmit data voltages of a same polarity, and a voltage value of the voltage adjusting signal equals a voltage value of a current data voltage output by the corresponding one or more of the signal lines.

* * * * *